3,824,140
METHOD OF INSULATING DUCTS
Albert Hofmann, Grunwald, Germany, assignor to Linde
Aktiengesellschaft, Wiesbaden, Germany
Filed June 12, 1972, Ser. No. 261,692
Claims priority, application Germany, June 11, 1971,
P 21 29 071.1
Int. Cl. B32b 33/00
U.S. Cl. 156—90                                        19 Claims

ABSTRACT OF THE DISCLOSURE

A method of insulating ducts, e.g. pipes adapted to constitute or carry cryogenic conductors and a duct-insulating system wherein a multilayer laminated insulation is prepared, preferably around a mandrel, is longitudinally split for removal from the mandrel and then is applied around the duct to be insulated. The layers may alternate metal foil with insulating layers, e.g. of a fabric composed of filaments of thermally nonconductive material. The insulation is preferably enclosed in an evacuated pipe.

FIELD OF THE INVENTION

My present invention relates to a method of insulating ducts and to a duct-insulating system and, more particularly, to improvements in the insulation of ducts adapted to be maintained at low temperatures, e.g. to prevent or limit heat loss from low-temperature conductors which may be operated under cryogenic conditions or may be in a superconductive state.

BACKGROUND OF THE INVENTION

It is not uncommon, especially in cryogenic systems, to provide a coaxial pipe arrangement whereby an inner duct is helically wound with alternate layers of a metal foil and a heat-insulating material or is spirally wound with two such layers to form a laminated insulating sheath around the inner duct with metal-foil layers alternating with thermally nonconductive layers. The assembly may then be enclosed in an evacuated outer pipe. Evacuation of the outer pipe and the space filled with the laminated insulation reduces heat conductivity from the exterior inwardly and the loss of "cold" from the interior to the exterior. The metal-foil layers act as reflective members to reduce heat transfer across the space between the pipes by radiation while the intervening insulating layers of woven or nonwoven fabric, paper, corrugated fiberboard and the like pervent heat conduction between the metal-foil layers and form isolating pockets for any residual gases to reduce heat transfer by convection.

Such systems have proved to be useful for the long-distance transfer of low-temperature liquids, such as liquefied gases at temperatures close to absolute zero and generally below minus 50° C. The liquids may also serve to cool electrical conductors traversing the inner pipe or constituted by this pipe to minimize electrical losses. When the temperature is sufficiently low, the conductor may be in a superconductive state.

Laminated insulating sheaths of this character have several disadvantages. Firstly, where a laminated stack of alternating metal foils and insulating layers is coiled spirally around the pipe, the foil forms a heat conductor running from an inner location substantially to the exterior and may be separated from the outer pipe only by a single thermally insulating layer. The same spirally wound foil is also separated from the inner pipe by a single insulating layer and consequently, heat transfer along the foil can result in considerable loss. In many cases, moreover, preparation of a stack of alternating layers on the inner pipe directly is a disadvantage.

OBJECTS OF THE INVENTION

It is the principal object of the present invention to provide an improved method of insulating a duct with a laminated or multilayer insulation whereby the aforementioned disadvantages are obviated.

It is another object of the invention to provide an improved insulated duct system in which a metal foil is incorporated in an insulating sheath but any fear of conduction along this sheath can be negatived.

Still another object of the invention is to provide an economical and convenient method of insulating ducts, especially ducts carrying cryogenic liquids or maintain the cryogenic temperatures, whereby the transfer of heat to the duct is minimiezd.

SUMMARY OF THE INVENTION

These objects and others, according to the invention, are attained by a method of insulating a pipe or producing an insulated duct wherein an insulating sheath is prepared by spirally winding a band of an insulating material and a metal foil around a mandrel, fixing a resulting sheath against relative displacement of the alternating foil and insulating layers, axially splitting the sheath and removing it from the mandrel and thereafter applying the split sheath to the inner pipe of an insulating duct. In this manner, a continuous metal foil running from an interior region toward an exterior region of the insulating sheath is broken up into a multiplicity of such foils equal in number to the product of the number of axial splits and the number of foil turns.

According to the invention, therefore, the sheath is formed as a hollow cylindrical shell within a multiplicity of alternating layers of metal and insulating material which is cut perpendicular to the individual turns and fitted around the pipe to embrace the latter.

The metal layer may be a metal foil which is self-supporting or a nonsupporting metal film applied to the carrier such as a synthetic-resin foil. Metallized fabric or paper may also be used. The thermally insulating foil interposed between layers of the metal foil, is preferably porous and composed of fibers which define interstices evacuatable within the space within the outer pipe. Woven and nonwoven fabrics composed of thermally nonconductive fibers and filaments, paper and corrugated mats or sheets or the like may be used.

Since the split sheath is simply applied around the pipe to embrace the latter, mounting is relatively simple and because the split also subdivides the metal foil, heat transfer through the sheath by conduction is reduced. An insulating sheath, according to the invention, may have 10 to 100 layers of metal foil or metallized synthetic-resin foil and intervening layers of synthetic resin or fiber material in alternating relationship.

According to the invention, a plurality of such insulating sheaths are provided axially along the inner pipe and a plurality of such sheaths are applied coaxially (nested) one upon another. When a number of such shells are applied, they preferably have their splits angularly offset to reduce heat penetration and improve the mechanical stability of the system. Furthermore, the parts of the shell may be held together by a helically applied bandage before an outer sheath is applied to the inner sheath.

The individual layers of each sheath may be held together by any convenient means although I prefer to stitch or sew the layers together. I also may make use of adhesives or spot-welding of the layers. It has been found to be advantageous to apply between the confronting edges defining the split, an insulating layer which can be bonded in place by an adhesive and extends perpendicular to the turns.

To avoid longitudinal thermal bridges between adjoining sheaths, the latter are spaced apart along the inner pipe by insulating disks lying in planes perpendicular to the pipe axis and preferably serving as holders for positioning within the outer or vacuum pipe. It is also advantageous to make the metal foils somewhat narrower than the insulating band to provide an overhang of the insulating material and prevent thermal bridging between the successive layers. Even if the ends of the sheaths are somewhat indented, therefore, the adjoining metal foils will not be likely to contact one another.

The present invention has been found to be particularly suitable for the thermal insulation of superconductive alternating current and direct-current conductors. In this case, the inner tube can be the conductor and can receive the cryogenic liquid such as liquefied helium or liquefied nitrogen. Of course, the superconductive cables may be received within the inner duct and can be held centrally therein by suitable spacers.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
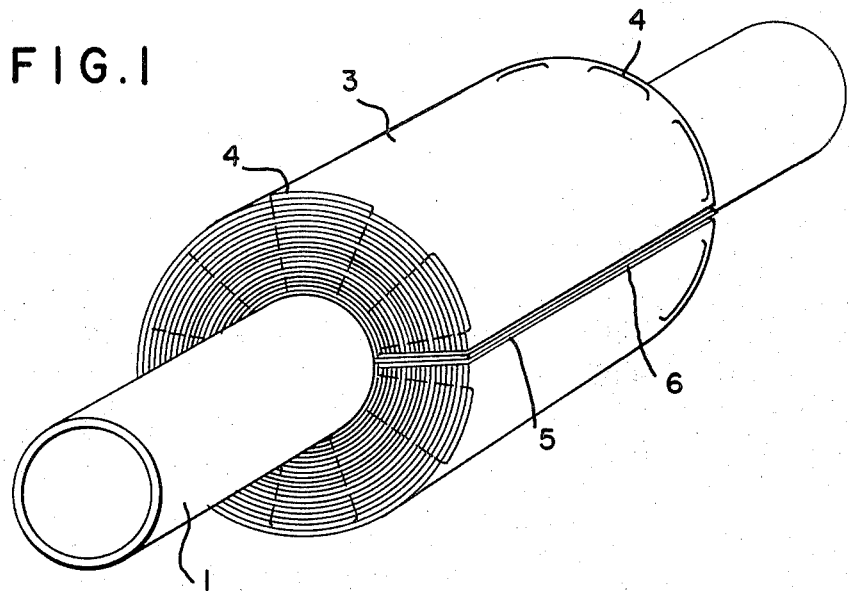
FIG. 1 is a somewhat diagrammatic perspective view of a portion of a pipe provided with an insulating sheath according to the present invention.

The insulating sheath 3 shown in FIG. 1 is mounted upon and embraces the pipe 1. This sheath which may be split at diametrically opposite sides, at angularly equispaced sides or only at one side, as shown, consists of a multiplicity of turns of an insulating fabric and metal foil which are wound upon a separate core or mandrel and fixed by rows of stitching 4. Thereafter, the spirally wound assembly is cut along its longitudinal axis, removed from the mandrel and applied around the pipe 1. The stitching is advantageously applied circumferentially along both ends of the sheath 3 with the threads extending radially through the layers to prevent relative shifting thereof. The stack of layers can thus be readily transported. As also shown in FIG. 1, an insulating layer 5, e.g. a synthetic-resin foil or fabric, is placed in the gap 6 and can be cemented to the confronting faces defining the split.

Figure 2:
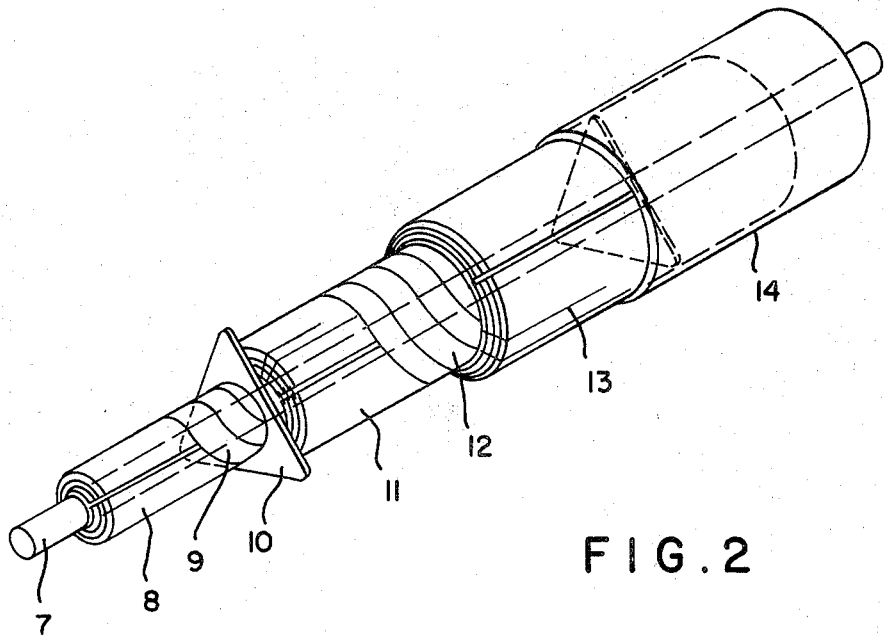
FIG. 2 is a similar view showing a multiple sheath arrangement according to the invention.

In FIG. 2, I have shown a more complex arrangement in which the final insulating body is to consist of three heat-insulating sheaths. The initial sheath 8 is applied directly to the inner pipe 7 and is held in place by a helically wound fabric band to which an adhesive can be applied. At the axial end of each sheath, there is provided a triangular spacer or some other holder, e.g. a circular-disk spacer adapted to engage the inner walls of a vacuum pipe 14 applied to the insulated duct 7. The radius of the circumscribing circle of the triangular spacer is greater than the outer diameter of the outer sheath 13. Successively applied sheaths 11 and 13 have their splits angularly offset from one another and from the split of sheath 8 and may be held in place by a helical band as shown in 12. The pipe 14 is then evacuated.

Figure 3:
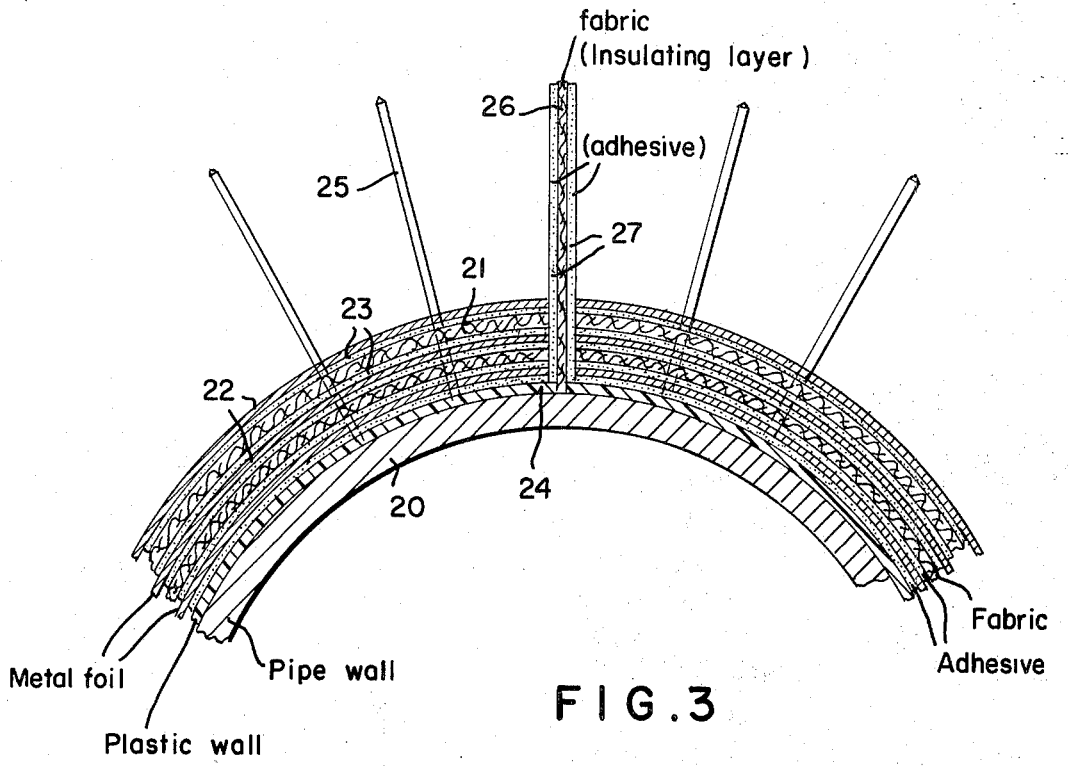
FIG. 3 is an enlarged cross-sectional view through a sheath upon its application to a pipe.

In FIG. 3, I have shown an insulating sheath arrangement according to the invention in somewhat greater detail. In this case, the pipe wall 20 is closely surrounded by the sheath which consists of insulating fabric layers 21 and metal-foil layers 22 which have been coated with adhesive 23 to bond the layers together. The coiling mandrel is first provided with a synthetic-resin foil sleeve 24 which is thin and forms part of the insulating sheath when the latter is applied to the pipe. The sleeve 24 is formed at opposite axis ends with crowns of synthetic-resin thermally insulating needles 25 which pierce the spirally wound layers and transfix them against movement until the adhesive sets. When the resulting sheath is split, therefore, the cut extends through the sleeve 24 and the entire assembly is applied around the pipe wall 20. A thin insulating layer 26 is inserted between the confronting faces of the sheath, only a few of the layers of which have been illustrated. The adhesive layers 27 flanking the insulating layer 26 bond the faces of the sheath together and also hold the insulating layer 26 in place.

Figure 4:
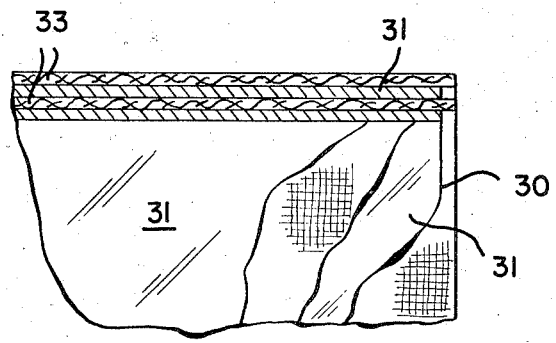
FIG. 4 is an elevational view, partly broken away of a portion of another insulating sheath.

From FIG. 4 it will be apparent that the longitudinal edge 30 of the metal-foil layers 31 is set back from the edge 32 of the fabric layers 33 so that, when these layers form the sheath, the metal foils are axially withdrawn from the overhanging fabric edges.

Figure 5:
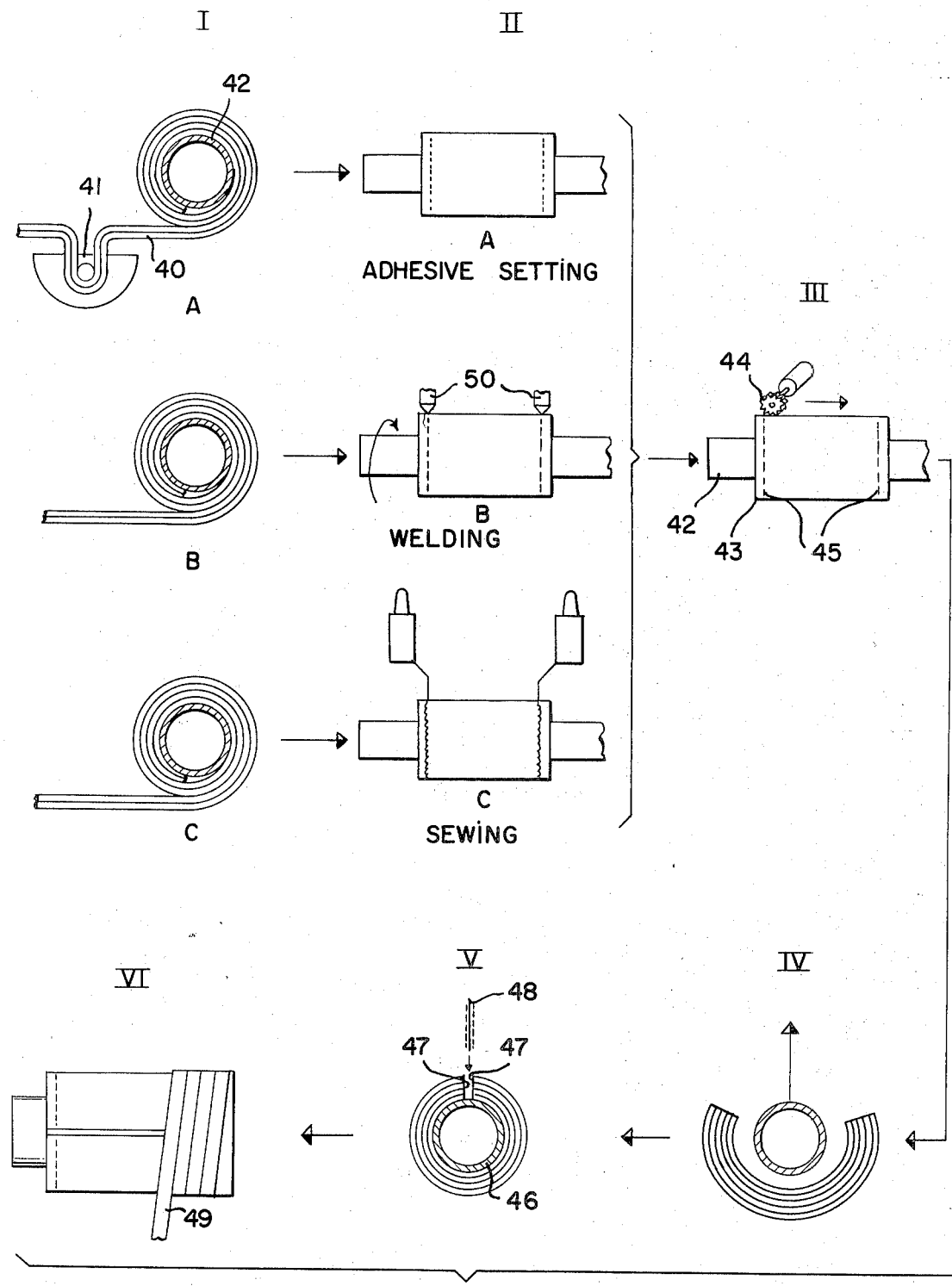
FIG. 5 is a flow diagram illustrating the principles of the invention.

In FIG. 5, I have shown a system for producing the insulated duct according to the invention, the system including the basic five stages including a sheath-forming stage I, a fixing stage II, a splitting stage III, a sheath-removal stage IV, the pipe-encasing stage V and the sheath-retaining stage VI.

At IA, I show a pair of layers, i.e. a metal foil and an insulating fabric, e.g. of glass fiber 40 which are passed through a trough 41 to coat the layers with adhesive, whereupon the layers are wound spirally upon a mandrel 42 provided with a sleeve 24 and needles 25 as previously described. When the adhesive has set (IIA), the sheath 43 is removed from the mandrel 42 by slitting it with a saw 44 in the longitudinal direction. The metal foil edges are represented at 45 and are shown to be set inwardly. The split sheath may then be spread apart (step IV) for removal from the mandrel and reapplied around a pipe 46, the confronting faces 47 being bonded to an adhesive-coated layer 48 inserted between them. An insulating fabric bandage 49 is then applied helically and further sheaths may be placed therearound (see FIG. 2) or the assembly inserted into a vacuum tube.

At IB, the sheath is wound without adhesive and the foils are thereupon held in place by spot-welding using heating heads 50 at spaced-apart locations. When the metal foil has a thermoplastic substrate, the spot-welding may be of the ultrasonic type or the high-frequency type to fuse the synthetic-resin foil to the intervening fabric layers which may likewise be of a thermoplastic material. At IIC, the sewing operation has been shown.

I claim:

1. A method of insulating a duct comprising the steps of winding turns of a reflective layer and a thermally insulating layer about a mandrel to form a sheath; fixing the layers of said sheath against relative displacement; longitudinally splitting said sheath and removing same from said mandrel; and embracing said duct within the split sheath, said sheath having confronting faces defining a split upon embracing said duct within the sheath, and interposing an insulating layer between said faces.

2. The method defined in claim 1 wherein said layers of said sheath are fixed by sewing through said layers.

3. The method defined in claim 1 wherein said layers are fixed by adhesively bonding them together.

4. The method defined in claim 1 wherein said layers are fixed by spot-welding them together.

5. The method defined in claim 1 wherein said layers are fixed by piercing them with a needle and retaining said needle within said layers.

6. The method defined in claim 1, further comprising retaining the sheath around said duct by applying a helical bandage thereto.

7. A method of insulating a duct comprising the steps of winding turns of a reflective layer and a thermally insulating layer about a mandrel to form a sheath; fixing the layers of said sheath against relative displacement; longitudinally splitting said sheath and removing same from said mandrel; and embracing said duct within the split sheath; and insulating said sheaths from one another by mounting spacers between them on said duct.

8. The method defined in claim 7, further comprising the step of fitting an outer vacuum duct over said spacers.

9. The method defined in claim 1 wherein said reflective layer is narrower than said insulating layer.

10. The method defined in claim 7 wherein said layers of said sheath are fixed by sewing through said layers.

11. The method defined in claim 7 wherein said layers are fixed by adhesively bonding them together.

12. The method defined in claim 7 wherein said layers are fixed by spot-welding them together.

13. The method defined in claim 7 wherein said layers are fixed by piercing them with a needle and retaining said needle within said layers.

14. The method defined in claim 7, further comprising retaining the sheath around said duct by applying a helical bandage thereto.

15. The method defined in claim 7 wherein said reflective layer is narrower than said insulating layer.

16. A method of insulating a duct comprising the steps of winding turns of a reflective layer and a thermally insulating layer about a mandrel to form a sheath; fixing the layers of said sheath against relative displacement by spot-welding them together; longitudinally splitting said sheath and removing same from said mandrel; and embracing said duct within the split sheath.

17. The method defined in claim 16 wherein said sheath has confronting faces defining a split upon embracing said duct within the sheath, further comprising the step of interposing as insulating layer between said faces.

18. The method defined in claim 16 wherein a plurality of such sheaths are applied in axially spaced relationship along said duct, further comprising the step insulating said sheaths from one another by mounting spacers between them on said duct.

19. The method defined in claim 18, further comprising the step of fitting an outer vacuum duct over said spacers.

References Cited

UNITED STATES PATENTS

| | | | |
|---|---|---|---|
| 2,066,475 | 1/1937 | Kramig et al. | 138—147 |
| 2,089,909 | 8/1937 | Mansfield | 138—147 |
| 2,670,763 | 3/1954 | Hiss | 138—147 |
| 2,756,172 | 7/1956 | Kidd | 138—147 |
| 2,758,043 | 8/1956 | Cryor | 138—151 X |
| 3,030,250 | 4/1962 | Losse | 138—147 |

EDWARD G. WHITBY, Primary Examiner

U.S. Cl. X.R.

138—113, 147, 151; 156—73, 92, 93, 189, 193, 195, 256, 290, 306; 161—196